(12) United States Patent
Niitsuma

(10) Patent No.: US 10,492,483 B1
(45) Date of Patent: Dec. 3, 2019

(54) DUAL-BEARING REEL

(71) Applicant: Shimano Inc., Sakai, Osaka (JP)

(72) Inventor: Akira Niitsuma, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 16/409,141

(22) Filed: May 10, 2019

(30) Foreign Application Priority Data

Jul. 13, 2018 (JP) .................. 2018-132787

(51) Int. Cl.
*A01K 89/01* (2006.01)
*A01K 89/015* (2006.01)
*A01K 89/033* (2006.01)

(52) U.S. Cl.
CPC .. *A01K 89/01931* (2015.05); *A01K 89/01921* (2015.05); *A01K 89/033* (2013.01); *A01K 89/0186* (2015.05)

(58) Field of Classification Search
CPC .......... A01K 89/0192; A01K 89/01921; A01K 89/01922; A01K 89/01923
See application file for complete search history.

(56) References Cited

U.S. PATENT DOCUMENTS

| | | | | |
|---|---|---|---|---|
| 5,370,331 A * | 12/1994 | Sato | ................. | A01K 89/01923 242/313 |
| 5,873,535 A * | 2/1999 | Jeung | ............... | A01K 89/01923 242/314 |
| 6,460,793 B1 * | 10/2002 | Hirayama | .......... | A01K 89/0192 242/313 |
| 7,070,139 B2 * | 7/2006 | Nakagawa | ....... | A01K 89/01922 242/313 |
| 7,350,730 B2 * | 4/2008 | Hyun | .................. | A01K 89/0192 242/314 |
| 9,072,284 B2 * | 7/2015 | Hyun | ................ | A01K 89/01923 |
| 9,439,408 B2 * | 9/2016 | Takechi | ............... | A01K 89/015 |
| 9,668,466 B2 * | 6/2017 | Sim | .................... | A01K 89/01921 |
| 9,763,434 B2 * | 9/2017 | Baldwin | .......... | A01K 89/01922 |
| 2004/0079822 A1 * | 4/2004 | Kawasaki | ........ | A01K 89/01931 242/322 |
| 2006/0006267 A1 * | 1/2006 | Hirayama | .......... | A01K 89/0192 242/223 |

(Continued)

FOREIGN PATENT DOCUMENTS

| | | | |
|---|---|---|---|
| JP | 2015-53916 B2 | 3/2015 | |
| JP | 2015-53917 B2 | 3/2015 | |

*Primary Examiner* — Emmanuel M Marcelo
(74) *Attorney, Agent, or Firm* — Global IP Counselors, LLP

(57) ABSTRACT

A dual-bearing reel includes spool support detachably coupled on a side of a reel body and rotatably supports a spool shaft. A cover is supported by the spool support to advance and retract between a proximate position for approaching and covering the spool support and a separated position that is separated in an axial direction. A lock engages the cover in the proximate position. First and second connecting parts support the cover on the spool support portion to be pivotable in a first direction, from a covering position in which the cover covers the spool support to an operating position in which the spool support can be attached and detached, and in an opposite second direction into an open position. In the operating position, the cover conceals a fastener fastening the first connecting part to the spool support, and, in the open position, exposes the fastener.

5 Claims, 9 Drawing Sheets

(56) References Cited

U.S. PATENT DOCUMENTS

| | | | |
|---|---|---|---|
| 2010/0288866 A1* | 11/2010 | Nakagawa | A01K 89/0155 242/289 |
| 2015/0076269 A1* | 3/2015 | Niitsuma | A01K 89/015 242/249 |
| 2015/0076270 A1* | 3/2015 | Ikebukuro | A01K 89/015 242/249 |
| 2017/0202192 A1* | 7/2017 | Niitsuma | A01K 89/0173 |

* cited by examiner

DUAL-BEARING REEL

CROSS-REFERENCE TO RELATED APPLICATIONS

This application claims priority to Japanese Patent Application No. 2018-132787, filed on Jul. 13, 2018. The entire disclosure of Japanese Patent Application No. 2018-132787 is hereby incorporated herein by reference.

BACKGROUND

Field of the Invention

The present invention relates to a dual-bearing reel in which a cover on a side for attaching and detaching a spool to/from a body can be opened and closed.

Background Art

In a conventional dual-bearing reel, a cover on a side for attaching and detaching a spool to/from a body is generally easily opened. For example, in the dual-bearing reel disclosed in Japanese Published Unexamined Application No. 2015-053917, a cover opening/closing structure sets the open/close state of a first side cover part by engaging a spool support portion and the first side cover part. A biasing element is disposed between the first side cover part and the cover opening/closing structure and biases the first side cover part such that the first side cover part can be opened. The rotation of the first side cover part is prevented by the engagement of either the first side cover part or the cover opening/closing structure with the other element, that is, the cover opening/closing structure or the first side cover part.

In a dual-bearing reel of Japanese Published Unexamined Application No. 2015-053916, the shape of the frame is essentially circular. A spool support portion is mounted inside the frame. The spool support portion rotatably supports the spool. A first side cover can be disposed in an opening of the frame. A cover opening/closing part is disposed between a spool and the first side cover inside the frame. The cover opening/closing part can open and close the first side cover by engagement with the spool support portion and the first side cover.

In the dual-bearing reels of Japanese Published Unexamined Application Nos. 2015-053917 and 2015-053916, a cover on a side for attaching and detaching a spool to/from a body is pivotably supported between a closed position, in which an attachment/detachment unit of a spool support portion is covered, and an operating position, in which the attachment/detachment unit can be manually operated, with the fulcrum occupying a position away from the central axis of the spool. The cover is supported by the spool support portion and can be detached from the body together with the spool support portion. The cover can be pivoted from the closed position covering the attachment/detachment unit in the direction of the operating position of the attachment/detachment unit, but cannot be turned in the opposite direction. In the operating position of the cover, a fastening element for attaching the cover to the spool support portion can be attached and detached so that the spool support portion can be assembled and disassembled.

In the dual-bearing reels of Japanese Published Unexamined Application Nos. 2015-053917 and 2015-053916, the fastening element of the spool support portion is visible with the cover in the operating position; thus, the user may inadvertently remove the fastening element and remove the cover from the spool support portion.

SUMMARY

The present invention was made in light of the circumstance described above, and an object thereof is to make it possible to assemble and disassemble the spool support portion and the cover and to conceal the fastening element for attaching the cover so that the fastening element cannot be removed in the normal operating position.

A dual-bearing reel according to an aspect of the present invention comprises a spool, a reel body, a spool support portion, a cover, a locking element, and a cover support part. A fishing line can be wound around the spool. The reel body rotatably supports the spool and in which is formed an opening through which the spool can pass in the direction of the axis of rotation of the spool. The spool support portion is detachably coupled to the opening side of the reel body and rotatably supports a shaft of the spool on the opening side. The cover is supported by the spool support portion on the outside of the reel body on the opening side so as to be able to advance and retract between a closed proximate position for covering the spool support portion by approaching the spool support portion coupled to the reel body and a separated position separated from the spool support portion in the axial direction of the spool. The locking element engages the cover when the cover is in the proximate position and can hold the cover in the proximate position. The cover support part supports the cover on the spool support portion so as to be pivotable in a first direction, from a covering position in which the cover conceals the spool support portion to an operating position in which the spool support portion can be attached and detached, and in a second direction, which is opposite to the first direction, into an open position, about a supporting shaft that is separated from the center of the spool support portion and that intersects a main surface of the cover when the cover is in the separated position. In the operating position, the cover conceals the element for fastening the cover support portion to the spool support portion, and, in the open position, the fastening element is exposed.

Preferably, the dual-bearing reel has a restraining part that restrains the pivoting of the cover from the covering position to the open position.

Preferably, the dual-bearing reel has a first biasing element that biases the cover from the proximate position to the separated position.

Preferably, the dual-bearing reel comprises a second biasing element that biases the cover in the first direction when the cover is in the separated position.

Preferably, or alternatively, the dual-bearing reel comprises a coil spring, which biases the cover from the proximate position to the separated position, and a torsion spring, which biases the cover in the first direction with the cover in the separated position, the coil spring and the torsion spring being integrally formed.

By the present invention, the cover support portion supports the cover on the spool support portion so as to be pivotable in a first direction, from the covering position in which the cover conceals the spool support portion to the operating position in which the spool support portion can be attached and detached, and in the open position in the second direction, which is opposite to the first direction. In the operating position, the cover conceals the element for fastening the cover support portion to the spool support portion, and, in the open position, the fastening element is exposed;

therefore, it is possible to assemble and disassemble the spool support portion and the cover and to conceal the fastening element for attaching the cover such that the fastening element cannot be removed in the normal operating position.

DETAILED DESCRIPTION OF THE EMBODIMENT

Figure 1:
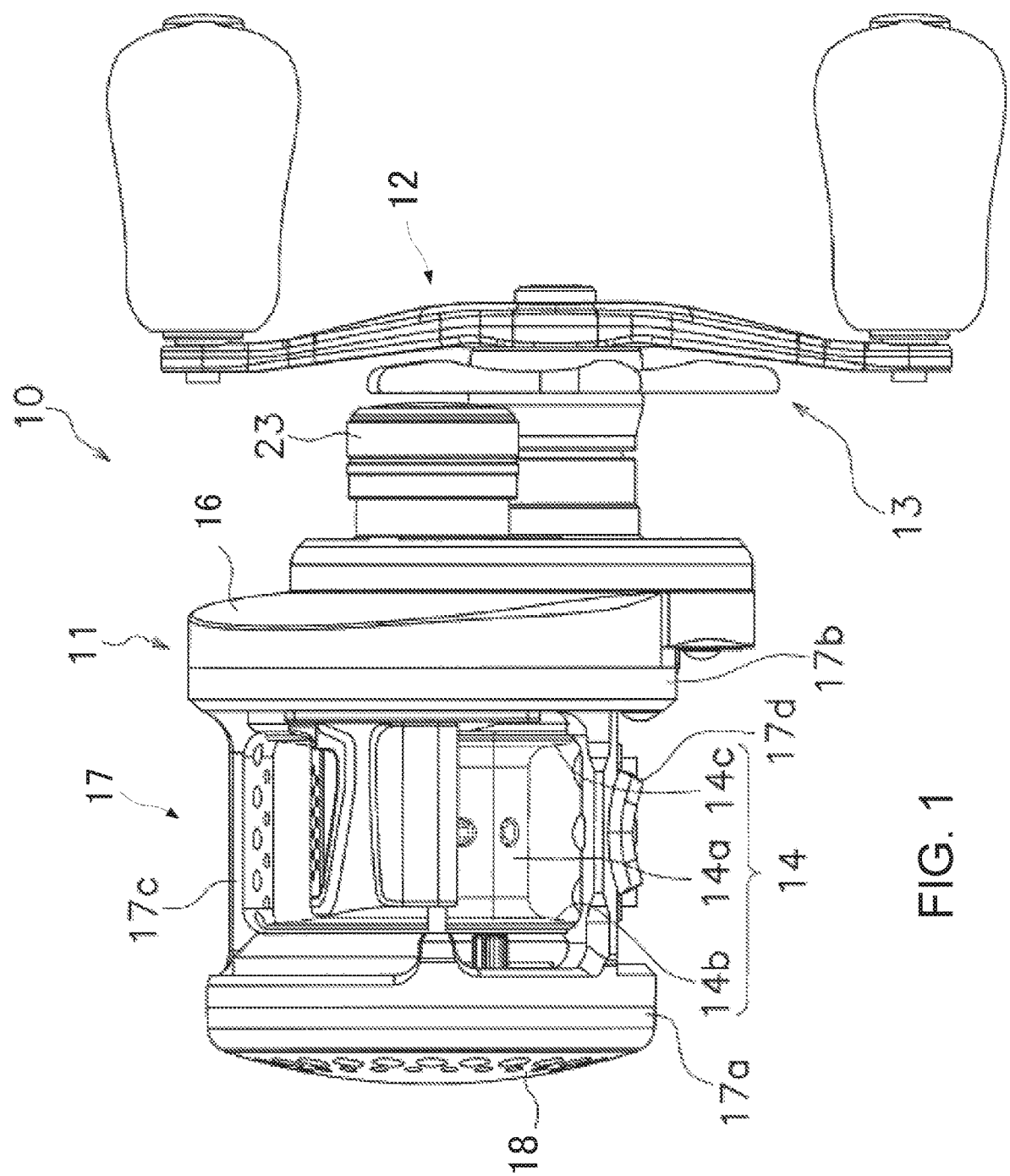
FIG. 1 is a front view of a dual-bearing reel according to a first embodiment of the present invention.

An embodiment of the present invention will be described in detail below with reference to the drawings. Identical or equivalent parts have been assigned the same reference numerals.

First Embodiment

FIG. 1 is a front view of a dual-bearing reel according to a first embodiment of the present invention. FIG. 1 is a view of the dual-bearing reel 10 mounted on a fishing rod as seen from the back end of the fishing rod. The dual-bearing reel 10 comprises a reel body 11 that is mounted on a fishing rod, a spool 14 that is rotatably supported by the reel body 11 and around which a fishing line is wound, a handle 12 for rotating the spool 14, a resistance operator 23 for adjusting a casting controller, and a star drag 13 for adjusting the drag.

The reel body 11 includes a frame 17 composed of a first side plate 17a, a second side plate 17b, a connecting portion 17c, and a fishing rod mounting portion 17d. The reel body 11 includes a cover 18 on a side of the frame 17 to/from which the spool 14 is attached/detached, and a drive mechanism housing part 16 that covers the handle 12 side. The spool 14 has a bobbin trunk 14a around which the fishing line is wound, and a first flange portion 14b and a second flange portion 14c, constituting a left-right pair, formed having a large diameter at two ends of the bobbin trunk 14a. The first flange portion 14b is disposed on the opposite side of the handle 12 and the second flange portion 14c is disposed on the handle 12 side.

Figure 2:
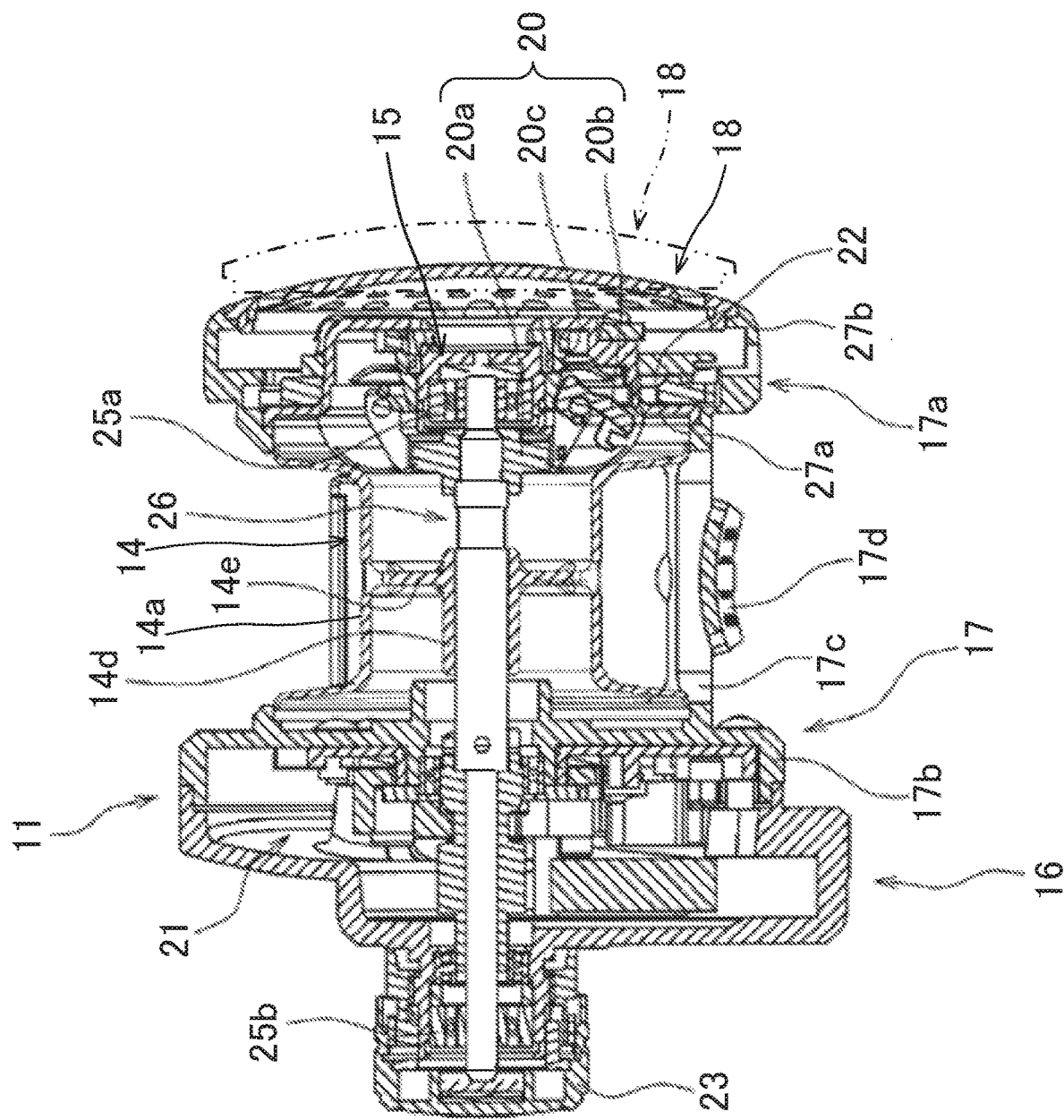
FIG. 2 is a cross-sectional view of the dual-bearing reel according to the first embodiment.

FIG. 2 is a cross-sectional view of the dual-bearing reel according to the first embodiment. A tubular attaching portion 14d, to which a spool shaft 26 is coupled so as to be integrally rotatable, is formed on the inner peripheral side of the bobbin trunk 14a of the spool 14. The attaching portion 14d is formed integrally with the bobbin trunk 14a via a disk-shaped connecting portion 14e. The spool shaft 26 is rotatably supported by a first shaft bearing 25a on a side of the first side plate 17a and a second shaft bearing 25b disposed in a boss portion in which the resistance operating unit 23 of the drive mechanism housing part 16 is disposed.

The first side plate 17a of the frame 17 has a first side plate body 27a and a tubular portion 27b that is integrally formed on the outer periphery of the first side plate body 27a. An opening 22 is formed in the first side plate body 27a. The spool 14 can pass through the opening 22 in the axial direction. A spool support portion 15 and the cover 18 are disposed on the inner peripheral side of the tubular portion 27b. The spool support portion 15 is detachably coupled to the first side plate body 27a so as to cover the opening 22. The spool support portion 15 holds the first shaft bearing 25a.

A spool braking device (brake) 20 for suppressing backlash during casting is disposed in the tubular portion 27b of the first side plate 17a. The spool braking device 20 brakes the spool 14 in accordance with the rotation of the spool 14. The spool braking device 20 includes a rotating element 20a, a plurality of brake shoes 20b, and a brake drum 20c. The rotating element 20a is attached to the spool shaft 26 so as to be integrally rotatable. Each of the plurality of brake shoes 20b is pivotably attached to the rotating element 20a.

The brake drum 20c is held so as not to rotate relative to the spool support portion 15. The brake drum 20c can be moved in a direction approaching the spool 14 or a direction away from the spool 14, and the spool support portion 15 holds the brake drum 20c in that position.

When the rotating element 20a rotates together with the spool 14, the brake shoe 20b is pivoted by centrifugal force. The brake shoe 20b contacts the brake drum 20c, braking the rotation of the spool 14. The timing and the braking force with which the spool 14 is braked can be changed by the position of the brake drum 20c.

The drive mechanism housing part 16 is attached to the second side plate 17b. A casting control mechanism 21 for adjusting the resistive force when the spool 14 is rotated is disposed between the second side plate 17b and the drive mechanism housing part 16.

Figure 3:
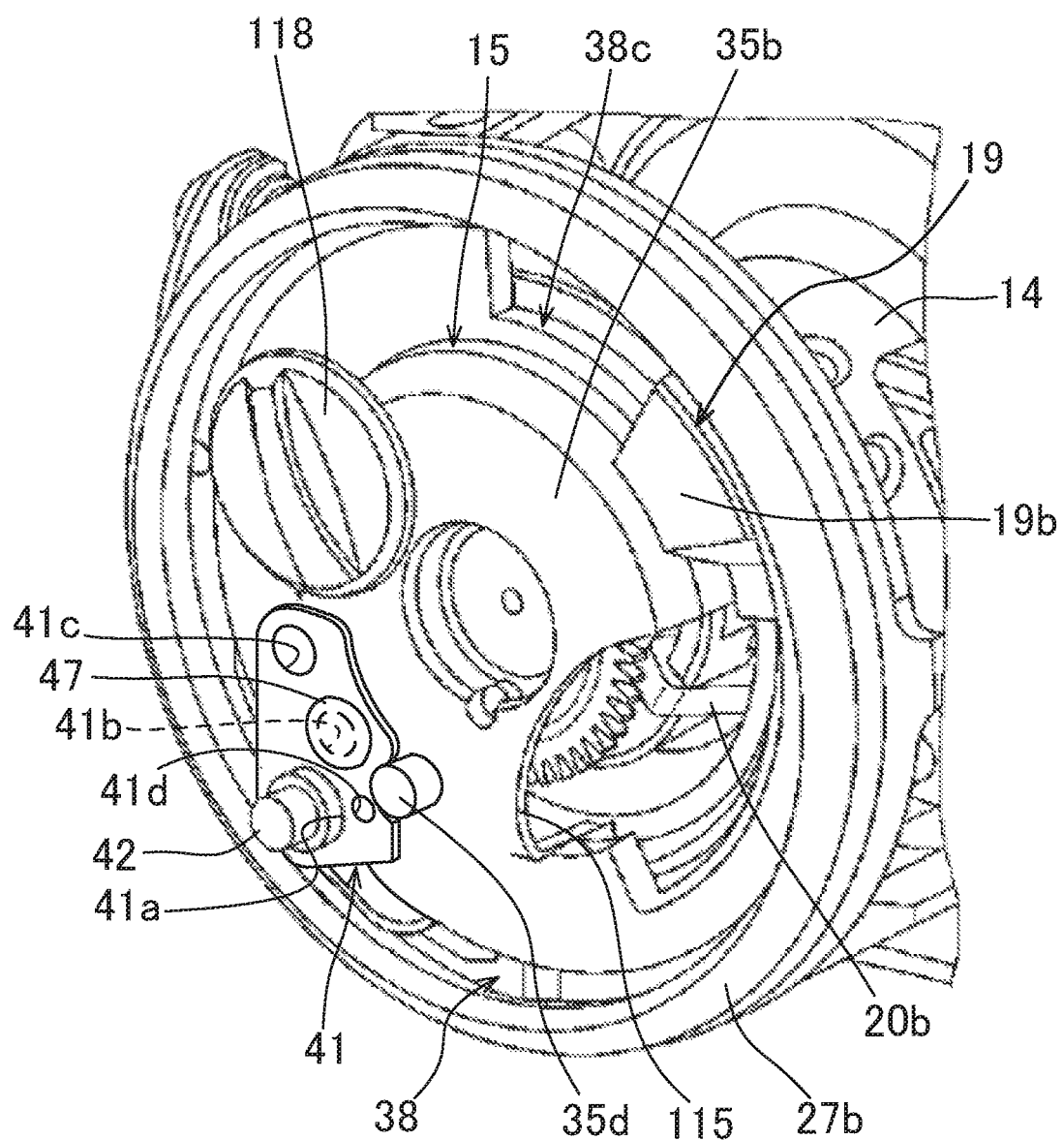
FIG. 3 is a perspective view of the dual-bearing reel according to the first embodiment, excluding a cover.

FIG. 3 is a perspective view of the dual-bearing reel according to the first embodiment without the cover. FIG. 3 shows a side of the first side plate 17a. The spool support portion 15, an attaching/detaching part 19, and a locking element (lock) 38 are disposed on the inner peripheral portion of the tubular portion 27b. The attaching/detaching part 19 and the locking element 38 are formed with an annular shape and are pivotably fitted on the outer periphery of a cylindrical brake housing portion 35b that is formed in the spool support portion 15. An operating knob 19b formed on the attaching/detaching part 19 is disposed in a notched portion 38c that is formed on the outer periphery of the locking element 38. The attaching/detaching part 19 includes a bayonet protrusion formed on the outer periphery thereof and engages a bayonet groove formed on the first side plate 17a to form a bayonet structure. The spool support portion 15 can be attached to/detached from the first side plate 17a by operating the operating knob 19b formed in the attaching/detaching part 19 to pivot the attaching/detaching part 19.

A first connecting part 41 for connecting the cover 18 is coupled to the spool support portion 15 by a screw 47. A hole 41a in which a second connecting part 42 can slide, a screw hole 41b for the screw 47 to pass through, and a hole 41c for preventing rotation are formed in the first connecting part 41. When a projection of the spool support portion 15 fits in the hole 41c, the first connecting part 41 is prevented from rotating relative to the spool support portion 15. The second connecting part 42 that fits in the hole 41a has a stepped cylindrical shape, and the cover 18 is fixed to the distal end thereof.

The second connecting part 42 fits in the hole 41a so as to be slidable, and the cover 18 is fixed to the distal end of the second connecting part 42. As shown in FIG. 2, the cover 18 is supported by the spool support portion 15 on the outside side of the reel body 11 on the opening 22 side so as to be able to advance and retract between the closed proximate position for concealing the spool support portion 15 by approaching the spool support portion 15 that is coupled to the first side plate 17a, and a separated position that is separated from the spool support portion 15 in the axial direction of the spool 14. The locking element 38 can be pivoted between a locked position for holding the cover 18 in the proximate position and a released position for allowing the cover 18 to advance and retract.

Since the second connecting part 42 can rotate in the hole 41a of the first connecting part 41, the cover 18 can pivot about the second connecting part 42 in the separated position. Since the cover 18 is fitted on the tubular portion 27b of the first side plate 17a in the proximate position, pivoting about the second connecting part 42 is prevented.

A projection 35d for restricting the pivoting range of the cover 18 is formed on the spool support portion 15. In addition, the spool support portion 15 supports a brake adjustment part 118 for adjusting the position of the brake drum 20c and a window portion 115 for accessing the brake shoes 20b is formed thereon.

Figure 4:
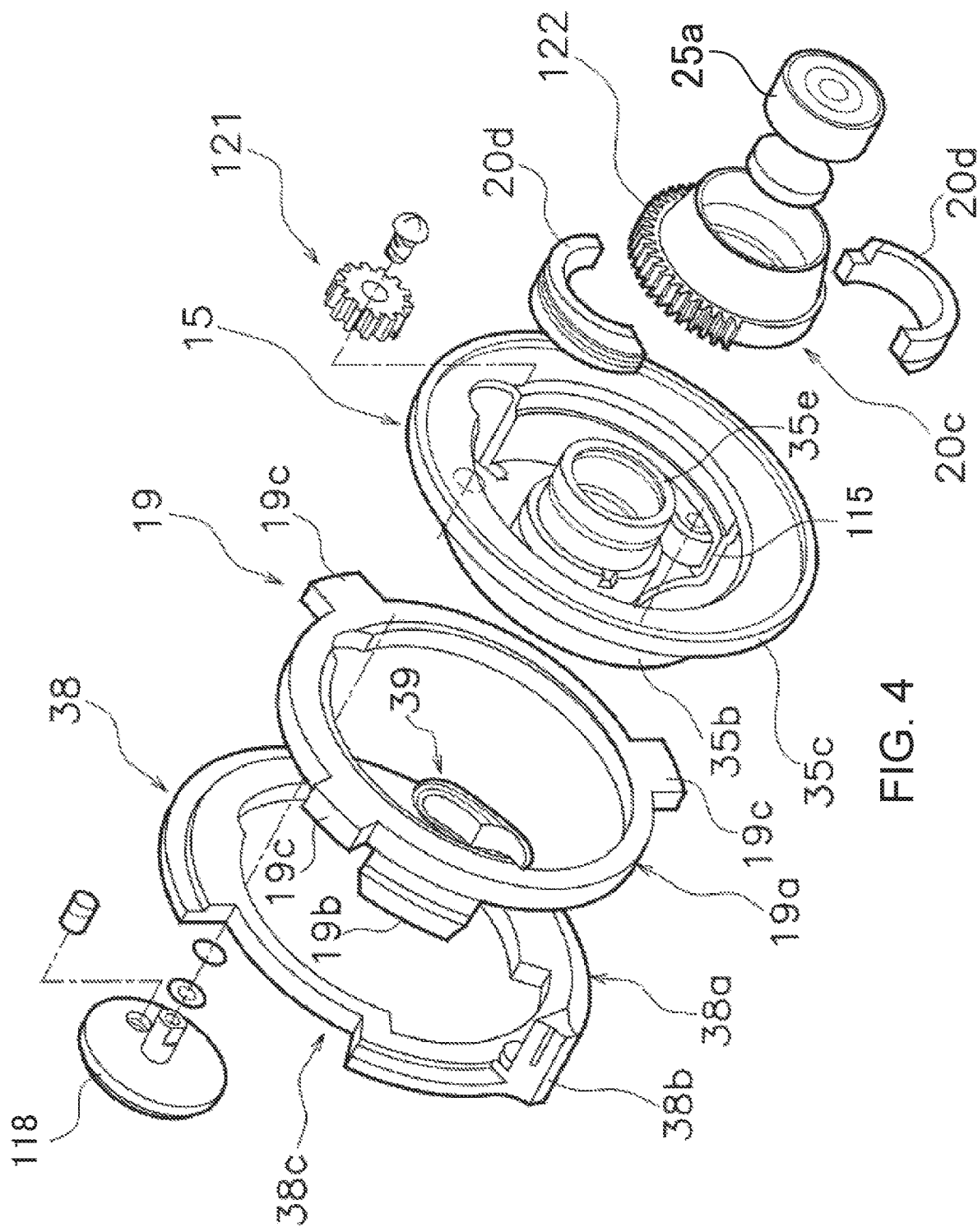
FIG. 4 is an exploded perspective view of an attachment/detachment unit of the dual-bearing reel according to the first embodiment.

FIG. 4 is an exploded perspective view of an attachment/detachment unit of the dual-bearing reel according to the first embodiment. The spool support portion 15 has the brake housing portion 35b, a flange portion 35c, and a shaft bearing housing portion 35e for housing the first shaft bearing 25a. A brake cam 20d is housed in the brake housing portion 35b. The window portion 115 for setting the brake shoes 20b disposed on the spool 14 is formed in the brake housing portion 35b. The brake shoes 20b are set to be pivotable or non-pivotable through this window portion 115.

The flange portion 35c is integrally formed on the outer periphery of the brake housing portion 35b. The projection 35d shown in FIG. 3 is formed on the brake housing portion 35b. The shaft bearing housing portion 35e is integrally formed on the inner peripheral portion of the spool support portion 15 so as to protrude from the brake housing portion 35b in a direction along the spool shaft 26. The spool support portion 15 rotatably supports an edge of the spool shaft 26 on the first side plate 17a side via the first shaft bearing 25a housed in the shaft bearing housing portion 35e.

The brake drum 20c engages the shaft bearing housing portion 35e via the brake cam 20d. The brake cam 20d is disposed between the inner peripheral portion of the brake drum 20c and the outer peripheral portion of the shaft bearing housing portion 35e. A cam groove is formed on the outer peripheral portion of the brake cam 20d, and a cam protrusion that engages with the cam groove is formed on the inner peripheral portion of the brake drum 20c.

When the brake adjustment part 118 is rotated, a first gear portion 121 fixed to the brake adjustment part 118 and a second gear portion 122 of the brake drum 20c that meshes with the first gear portion 121 rotate. The brake drum 20c rotates with this rotation. The brake drum 20c, by the brake cam 20d, then moves in a direction approaching the spool 14 or a direction away from the spool 14. The brake drum 20c is thereby positioned, and the braking force of the spool 14 when the brake shoes 20b contacts the brake drum 20c is determined.

The attaching/detaching part 19 has an annular portion 19a, the operating knob 19b, and a bayonet protrusion 19c that is integrally formed on the outer periphery of the annular portion 19a. The locking element 38 has an annular portion 38a, an operating knob 38b that extends from the annular portion 38a in the axial direction of the spool 14, and an elongated hole portion 39 that engages the second connecting part 42; a notched portion 38c in which the operating knob 19b of the attaching/detaching part 19 is disposed is formed on the outer periphery of the annular portion 38a.

The annular portion 38a is pivotably attached to the spool support portion 15. The annular portion 38a can be rotated relative to the spool support portion 15 when opposing the flange portion 35c of the spool support portion 15. The annular portion 38a is disposed on the outer periphery of the brake housing portion 35b of the spool support portion 15. The operating knob 38b pivots the locking element 38. Accordingly, it is possible to pivot the locking element 38 about the spool support portion 15 by operating the operating knob 38b.

Figure 5:
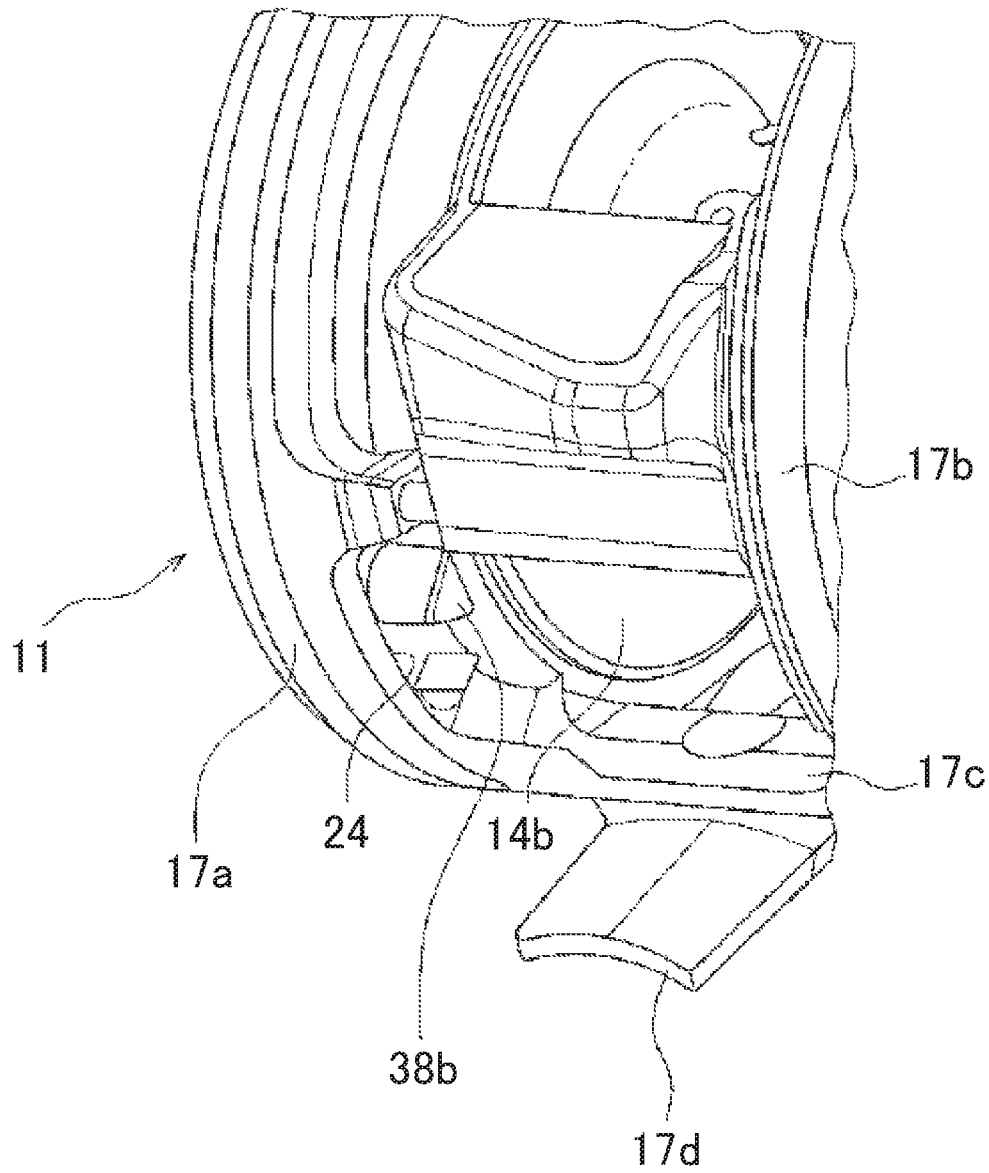
FIG. 5 is a partial perspective view of the dual-bearing reel according to the first embodiment.

FIG. 5 is a partial perspective view of the dual-bearing reel according to the first embodiment. An elongated hole 24 that penetrates from the inner peripheral side of the tubular portion 27b to the second side plate 17b side and extends along the circumference around the center of the spool support portion 15 is formed on the first side plate body 27a of the first side plate 17a. The operating knob 38b of the locking element 38 is disposed in the elongated hole 24. The operating knob 38b can be seen from the outside of the reel body 11 between the first side plate 17a and the first flange portion 14b of the spool 14. It is possible to pivot the locking element 38 about the spool support portion 15 within the range of the elongated hole 24 by operating the operating knob 38b.

Figure 6:
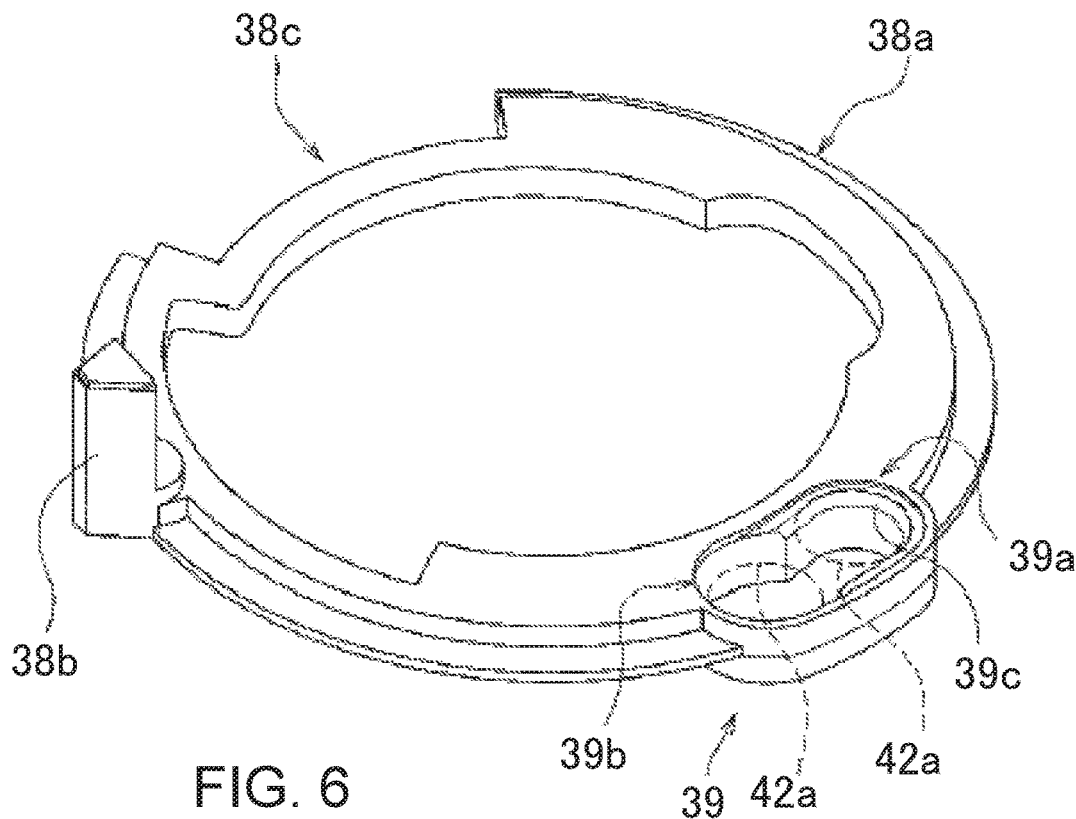
FIG. 6 is a perspective view of a locking element of the dual-bearing reel according to the first embodiment.

FIG. 6 is a perspective view of the locking element of the dual-bearing reel according to the first embodiment. The elongated hole portion 39 is formed in the annular portion 38a and extends in the circumferential direction. A first hole portion 39a of small inner diameter is formed in the elongated hole portion 39 at an end far from the operating knob 38b. In addition, a second hole portion 39b with an inside diameter larger than that of the first hole portion 39a is formed at the end closer to the operating knob 38b. The second connecting part 42 is disposed in the elongated hole portion 39.

The inside diameter of the first hole portion 39a of the elongated hole portion 39 is smaller than the outside diameter of a head portion 42a, which is the maximum outside diameter of the stepped cylindrical second connecting part 42, and the inside diameter of the second hole portion 39b is larger than the outside diameter of the head portion 42a. The first hole portion 39a and the second hole portion 39b are connected via the width of the diameter of the first hole portion 39a. Thus, the elongated hole portion 39 and the second connecting part 42 are relatively movable in the circumferential direction of the annular portion 38a. When the second connecting part 42 is positioned in the first hole portion 39a, the head portion 42a of the second connecting part 42 engages an edge 39c, and the second connecting part 42 will not fall out of the elongated hole portion 39; however, the head portion 42a is not engaged in the second hole portion 39b, and the second connecting part 42 is able to pass through the elongated hole portion 39.

Figure 7A:
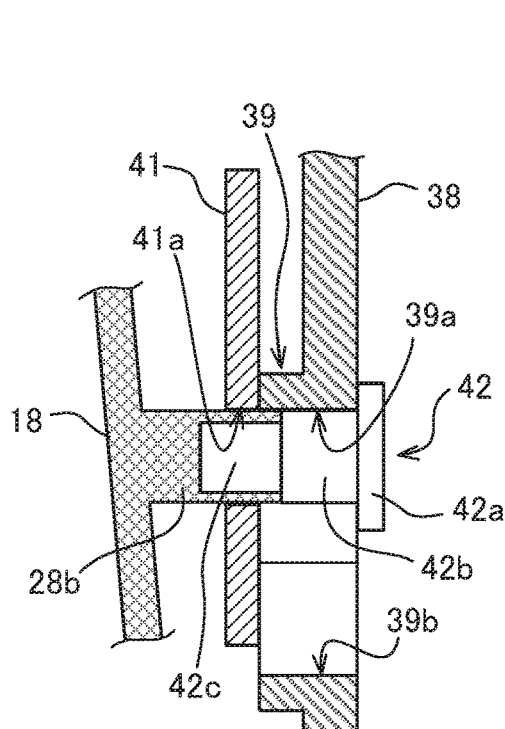
FIG. 7A is a cross-sectional view of a support portion of the dual-bearing reel according to the first embodiment.

FIG. 7A shows a cross-sectional view of a support portion of the dual-bearing reel according to the first embodiment. FIG. 7A shows the situation in which the locking element 38 is in the locked position for holding the cover 18 in the proximate position. The second connecting part 42 has the head portion 42a which has a larger outside diameter, a distal end portion 42c which has a small outside diameter, and a shaft portion 42b which has an intermediate diameter that connects the head portion 42a and the distal end portion 42c. The outside diameter of the shaft portion 42b is smaller than the inside diameter of the first hole portion 39a of the elongated hole portion 39 and the inside diameter of the hole 41a of the first connecting part 41 and can slide and rotate in the hole 41a. The central shaft of the second connecting part 42 is a support shaft that is separated from the center of the spool support portion 15 and that intersects the main surface of the cover 18.

A support portion 28b formed on the cover 18 is connected to the distal end portion 42c of the second connecting part 42. The cover 18 is fixed to the distal end portion 42c of the second connecting part 42 by the support portion 28b. The outside diameter of the support portion 28b is smaller than the inside diameter of the hole 41a of the first connecting part 41 and can slide in the hole 41a.

When the second connecting part 42 shown in FIG. 7A is positioned in the first hole portion 39a, the head portion 42a of the second connecting part 42 engages the edge 39c of the elongated hole portion 39, and the second connecting part 42 cannot be pulled out toward the cover 18 side. That is, the cover 18 is held in the proximate position. The locking element 38 engages the second connecting part 42, but since the second connecting part 42 is fixed to the cover 18, the second connecting part 42 is a part of the cover 18, and the locking element 38 engages the cover 18.

As shown in FIG. 3, the first connecting part 41 is fixed to the spool support portion 15, and the locking element 38 is pivotably attached to the spool support portion 15. The elongated hole portion 39 can be moved into a position in which the second connecting part 42 is contacts the side of the second hole portion 39b by pivoting the locking element 38 from the locked position shown in FIG. 7A.

Figure 7B:
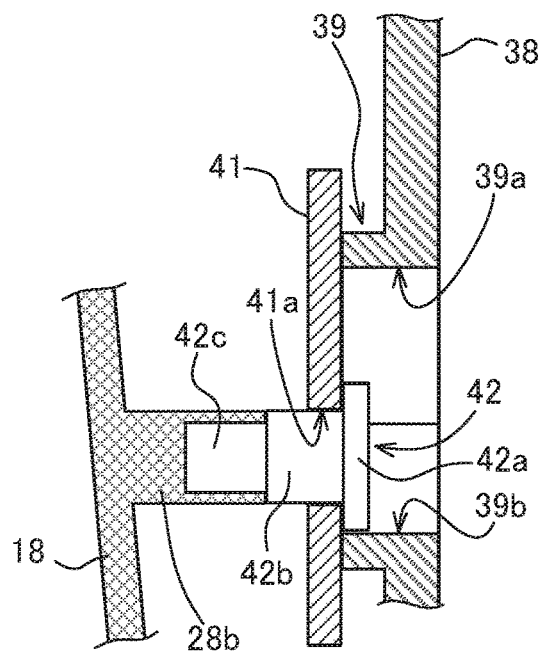
FIG. 7B is a cross-sectional view of the support portion when the cover is in a separated position

FIG. 7B is a cross-sectional view of the support portion when the cover is in the separated position. FIG. 7B shows the situation in which the locking element 38 is in the release position in which the cover 18 can advance and retract. Since the inside diameter of the second hole portion 39b is larger than the outside diameter of the head portion 42a of the second connecting part 42, when the locking element 38 is pivoted and the elongated hole portion 39 is moved into a position in which the second connecting part 42 contacts the side of the second hole portion 39b, the head portion 42a can be pulled out through the second hole portion 39b toward the first connecting part 41 side. FIG. 7B shows a state in which the second connecting part 42 is pulled out.

When the second connecting part 42 is pulled out toward the first connecting part 41 side, the cover 18 fixed to the distal end portion 42c separates from the spool support portion 15 in the axial direction of the spool 14. Since the internal diameter of the hole 41a of the first connecting part 41 is smaller than the outer diameter of the head portion 42a of the second connecting part 42, the head portion 42a engages the first connecting part 41 and the second connecting part 42 does not fall out of the first connecting part 41. As shown in FIG. 2, in the separated position of the cover 18, the cover 18 can be separated from the tubular portion 27b of the first side plate 17a and pivoted about the second connecting part 42.

The first connecting part 41 and the second connecting part 42 support the cover 18 so as to be able to advance and retract between the proximate position and the separated position. Furthermore, the first connecting part 41 and the second connecting part 42 form a cover support portion that supports the cover 18 so as to be pivotable between a first direction from the covering position to the operating position, and a second direction from the covering position to the open position.

Figure 8:
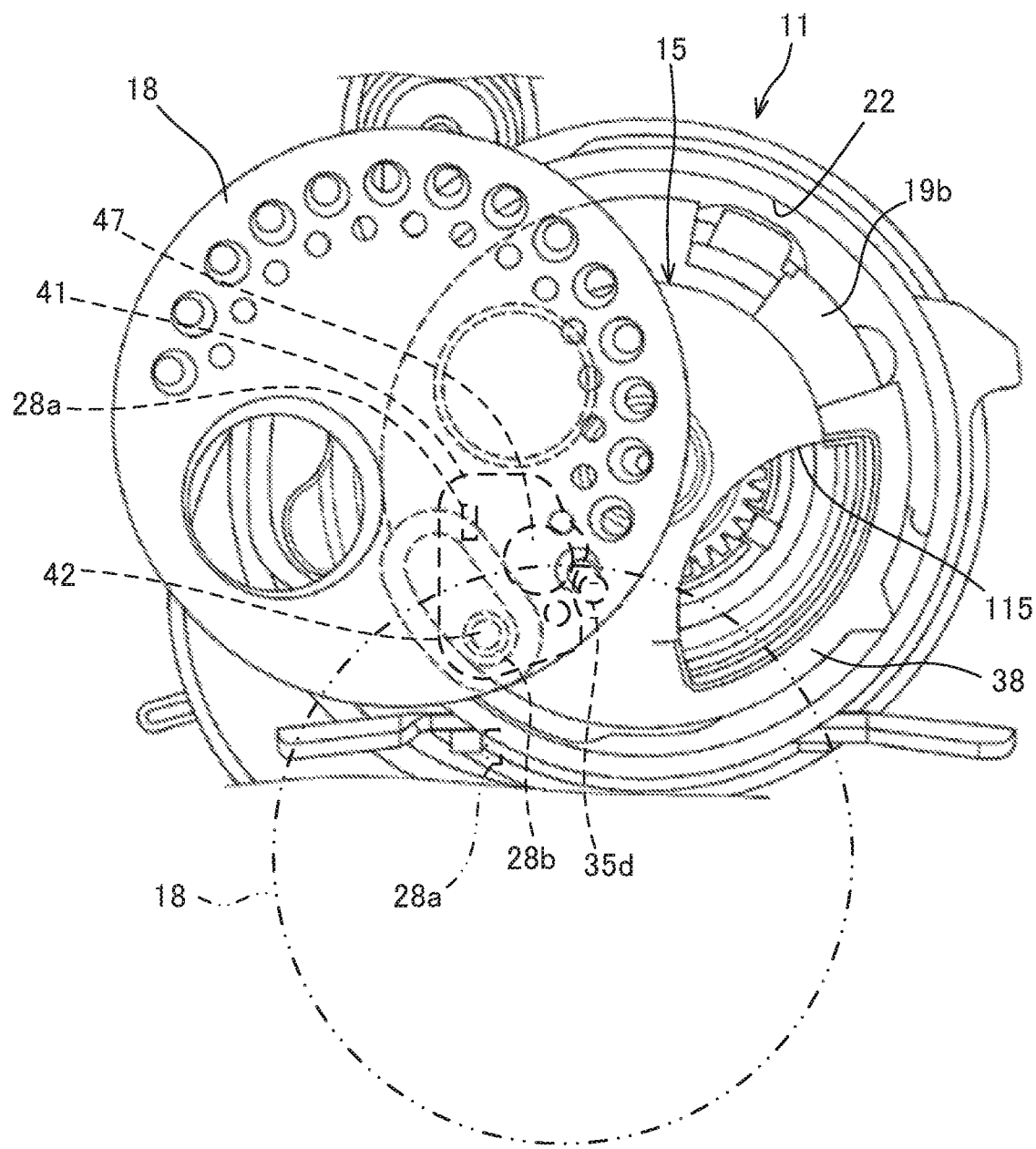
FIG. 8 is a side view of the dual-bearing reel according to the first embodiment.

FIG. 8 is a side view of the dual-bearing reel according to the first embodiment. FIG. 8 shows the cover 18 pivoted into the operating position, so that the spool support portion 15 can be attached and detached. In the covering position, in which the cover 18 is merely separated from the spool support portion 15 in the axial direction of the spool, the spool support portion 15 is concealed by the cover 18 and the operating knob 19b of the attaching/detaching part 19 cannot be operated, but in the separated position, the cover 18 can be pivoted about the second connecting part 42. When the cover 18 is pivoted in the counterclockwise direction of FIG. 8, which is the first direction, the operating knob 19b is exposed and can be operated. In addition, since the window portion 115 of the spool support portion 15 will also appear, the positions of the brake shoes 20b can be set.

In the operating position, in which the cover 18 is pivoted in the counterclockwise direction and the spool support portion 15 can be attached and detached, the inner periphery of the cover 18 abuts the projection 35d and cannot be turned further in the counterclockwise direction. In the operating position, the screw 47, which is the fastening element of the first connecting part 41, is covered by the cover 18 and cannot be removed.

The cover 18 can also be pivoted from the covering position in the clockwise direction, which is the second direction, opposite to the first direction. When the cover 18 is pivoted in the clockwise direction of FIG. 8, which is the second direction, the screw 47, which is the fastening element (fastener) of the first connecting part 41, is exposed from the cover 18 and can be removed. In FIG. 8, the open position of the cover 18, exposing the fastening element, is indicated by the chain double-dashed line. Similarly, when the cover is pivoted in the second direction, the inner periphery of the edge of the cover 18 abuts the projection 35d and cannot be turned further in the clockwise direction. In FIG. 8, although part of the screw 47 is covered by the cover 18 even in the open position, by using a hexagonal socket screw, the screw 47 can be turned with a thin tool, such as a hexagonal wrench.

In the example of FIG. 8, a locking portion 28a is formed on the back side of the cover 18. The distal end of the locking portion 28a just contacts the upper left of the projection 35d in the covering position. The locking portion 28a or the cover 18 can be elastically deformed and pivoted in the second direction over the projection 35d. The locking portion 28a and the projection 35d constitute a suppressing part (suppressor) that applies resistance to the pivoting of the cover 18 from the covering position to the open position.

The configuration may be such that the locking portion 28a is not provided and that pivoting is possible without the application of resistance in the second direction. In this embodiment, it is preferable that the pivot direction for the operating position be clearly indicated on the reel body 11.

In the dual-bearing reel 10 of the first embodiment, the cover 18 is pivotable in the first direction, from the covering position in which the cover 18 conceals the spool support portion 15 to the operating position in which the spool support portion 15 can be attached and detached, and the open position in the second direction, which is opposite to the first direction, about the supporting shaft that is separated from the center of the spool support portion 15 and that intersects the main surface of the cover 18 in a state in which the cover 18 is in the separated position. In the operating position, the cover 18 conceals the screw 47, which is the element for fastening the first connecting part 41, which is the cover support portion, to the spool support portion 15 of the first connecting part 41, and, in the open position, the screw 47 is exposed. As a result, in the dual-bearing reel 10 of the first embodiment, the spool support portion 15 and the cover 18 can be assembled and disassembled, and the screw 47 for attaching the cover 18 is concealed such that the screw cannot be removed in the normal operating position.

Second Embodiment

Figure 9A:
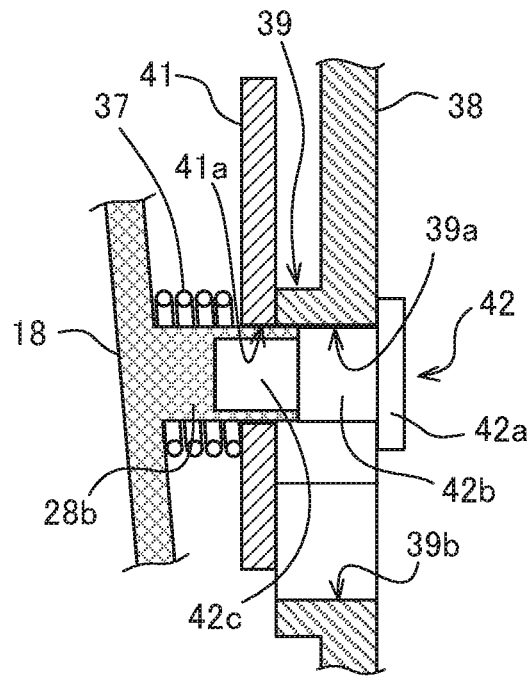
FIG. 9A is a cross-sectional view of the support portion of the dual-bearing reel according to a second embodiment.

FIG. 9A is a cross-sectional view of the support portion of the dual-bearing reel according to a second embodiment. FIG. 9A shows the situation in which the locking element 38 is in the locked position for holding the cover 18 in the proximate position. In the second embodiment, a biasing element 37 biases the cover 18 from the proximate position to the separated position. The other configurations are the same as those of the first embodiment.

The biasing element 37 is a compression coil spring and is disposed between the first connecting part 41 and the cover 18 so as to surround the support portion 28*b*. When the cover 18 is in the proximate position and the locking element 38 is in the locked position, the biasing element 37 is compressed.

Figure 9B:
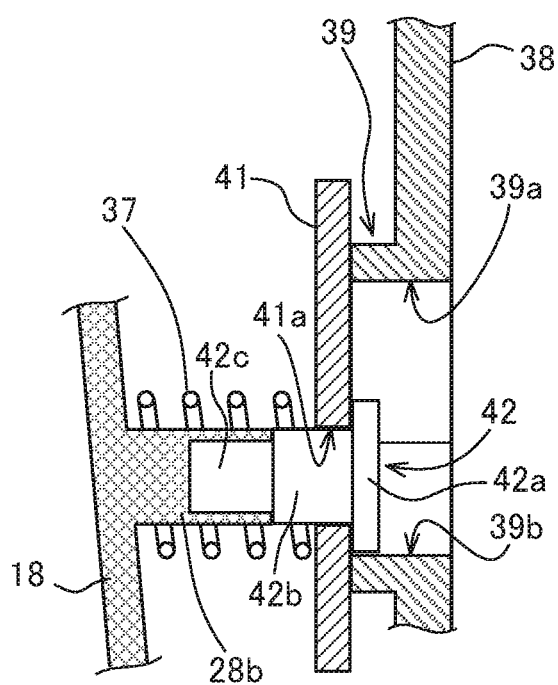
FIG. 9B is a cross-sectional view of the support portion of the dual-bearing reel according to a second embodiment.

FIG. 9B is a cross-sectional view of the support portion when the cover of the dual-bearing reel according to the second embodiment is in the separated position. When the locking element 38 is pivoted into the release position, the cover 18 is pushed out into the separated position by the expanding biasing force of the biasing element 37. In the second embodiment, the cover 18 need not be manually pulled out into the release position, but when the locking element 38 is pivoted into the release position, the cover automatically pops out into the separated position.

Figure 10:
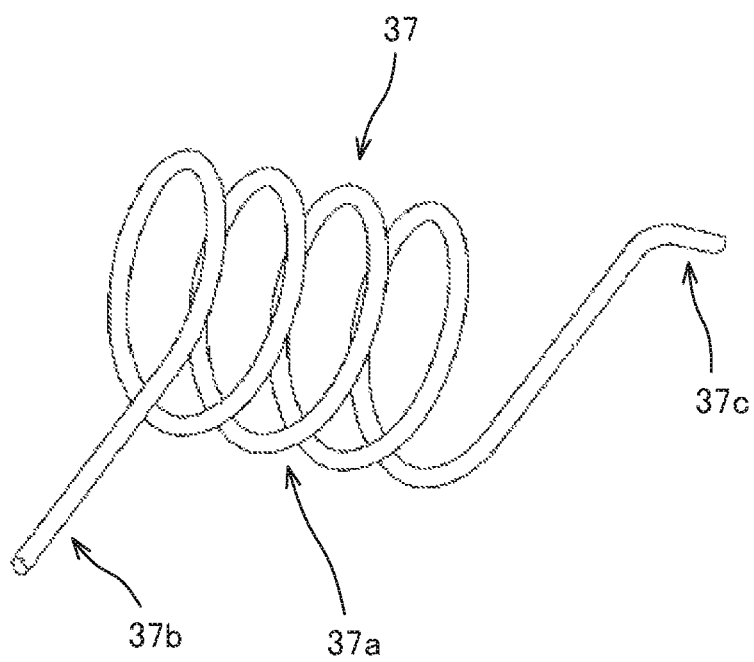
FIG. 10 is a perspective view of a biasing element of the dual-bearing reel according to the second embodiment.

FIG. 10 is a perspective view of a biasing element of the dual-bearing reel according to the second embodiment. The biasing element 37 has a coil spring 37*a*, a first locking portion 37*b*, and a second locking portion 37*c*. The coil spring 37*a*, the first locking portion 37*b*, and the second locking portion 37*c* constitute a torsion spring. That is, the biasing element 37 is a coil spring as well as a torsion spring. The biasing element 37 can be regarded as an integrally formed coil spring and torsion spring.

The first locking portion 37*b* of the biasing element 37 engages a groove, for example, that is formed on the inner periphery of the edge of the cover 18 and that is recessed in the radial direction. The second locking portion 37*c* engages a locking hole 41*d* (refer to FIG. 3), for example, formed in the first connecting part 41. The biasing element 37 biases the cover 18 in the first direction in the separated position of the cover 18.

Figure 11:
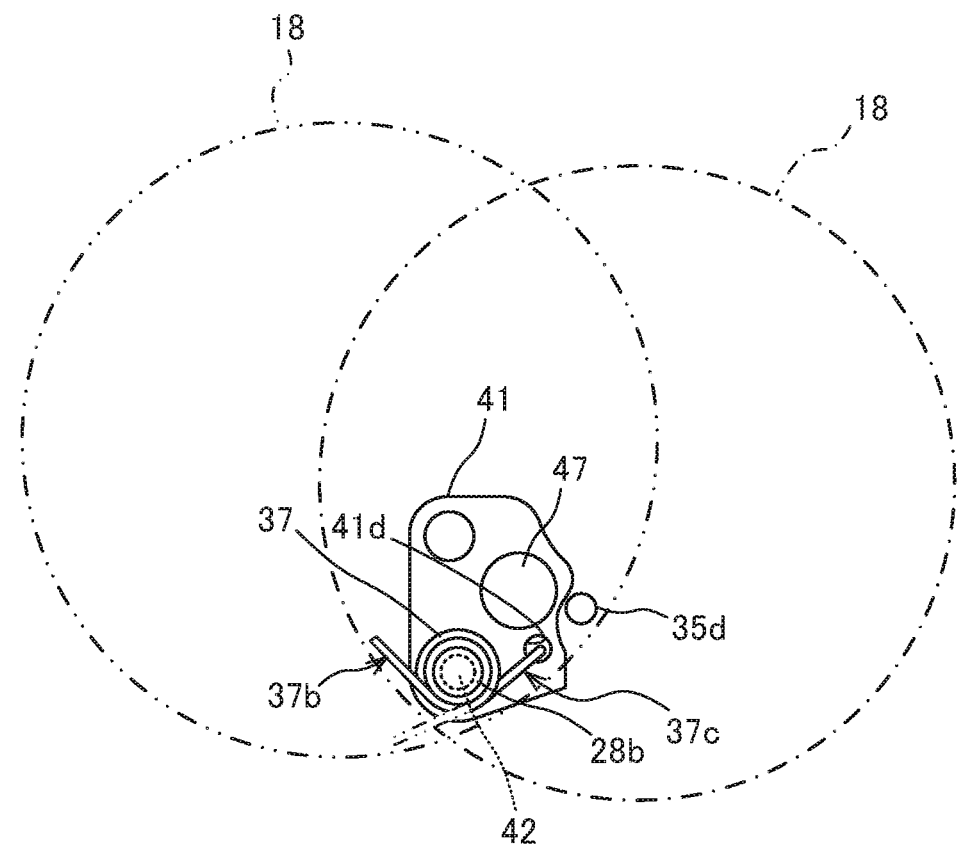
FIG. 11 is a view showing the operation of the biasing element of the dual-bearing reel according to the second embodiment.

FIG. 11 is a view illustrating the operation of the biasing element of the dual-bearing reel according to the second embodiment. In FIG. 11 the covering position of the cover 18 is indicated by the dashed line, and the operating position is indicated by the chain double-dashed line. The biasing element 37 is indicated by the solid line in the covering position state, and by the chain double-dashed line in the operating position state.

In FIG. 11, the biasing element 37 deforms in a direction in which the first locking portion 37*b* and the second locking portion 37*c*, from the operating position to the covering position of the cover 18, are closed. The biasing element 37 acts in the direction in which the first locking portion 37*b* and the second locking portion 37*c* are open, in the covering position of the cover 18. As a result, when the locking element 38 is switched from the locked position to the release position, the cover 18 protrudes from the proximate position to the separated position, and pivots counterclockwise, from the covering position to the operating position at the separated position. The inner periphery of the edge of the cover 18 abuts the projection 35 and stops at the operating position.

In order to bring the cover 18 to the proximate position, the cover is turned from the operating position of the spool support portion 15 to the covering position, against the force that opens the first locking portion 37*b* and the second locking portion 37*c*, and is pushed into the proximate position while compressing the coil spring 37*a*. The locking element 38 can be pivoted and held in the locked position while maintaining that state.

The cover 18 may be turned in the direction to further close the first locking portion 37*b* and the second locking portion 37*c* in order to further pivot the cover from the covering position to the open position, exposing the screw 47. In this embodiment, the biasing element 37 forms the suppressing part (suppressor) that applies resistance to the pivoting of the cover from the covering position to the open position.

Although the biasing element 37 is the suppressing part, the locking portion 28*a* may be provided in the same manner as the first embodiment. If it is formed such that the locking portion 28*a* abuts the projection 35*d* in the covering position of the cover 18, the covering position can be easily ascertained by the tactile sense of the hand that carries out the pivoting.

The biasing element 37 need not be configured as a coil spring and a torsion spring that are integrally formed. The two elements, i.e., the compression coil spring and support part the torsion coil spring, may be separate elements. Alternatively, one of either a compression coil spring or a torsion coil spring may be provided. When the biasing element 37 is composed of only the compression coil spring, it is preferable to include a locking portion 28*a* that abuts the projection 35*d* when the cover 18 is in the separated position.

In the second embodiment, since the cover 18 is biased from the proximate position to the separated position, it is not necessary to form a handgrip for pulling out the cover 18, and design restrictions are reduced. In addition, since the cover 18 is biased from the covering position to the operating position in the separated position, it is less likely that the cover will be mistakenly pivoted into the open position.

What is claimed is:
1. A dual-bearing reel, comprising
 a spool having a shaft and an axis of rotation, and around which a fishing line is wound;

a reel body rotatably supporting the spool, and including an opening on an opening side through which the spool can pass in a direction of the axis of rotation of the spool;

a spool support portion detachably coupled to the opening side of the reel body and rotatably supporting the shaft of the spool on the opening side;

a cover supported by the spool support portion on an outside of the reel body on the opening side so as to be able to advance and retract between a closed proximate position for covering the spool support portion by approaching the spool support portion coupled to the reel body, and a separated position separated from the spool support portion in the direction of the axis of rotation of the spool;

a lock engaging the cover when the cover is in the closed proximate position and configured to hold the cover in the closed proximate position; and a cover support portion supporting the cover on the spool support portion so as to be pivotable in a first direction, from a covering position in which the cover conceals the spool support portion to an operating position in which the spool support portion is capable of being attached and detached, and in a second direction, opposite to the first direction, into an open position, about a supporting shaft that is separated from the center of the spool support portion and that intersects a main surface of the cover in which the cover is in the separated position, in the operating position, the cover conceals a fastener for fastening the cover support portion to the spool support portion, and, in the open position, the fastener is exposed.

2. The dual-bearing reel according to claim 1, further comprising
a suppressor configured to apply resistance to the pivoting of the cover from the covering position to the open position.

3. The dual-bearing reel according to claim 1, further comprising
a first biasing element configured to bias the cover from the proximate position to the separated position.

4. The dual-bearing reel according to claim 3, further comprising
a second biasing element configured to bias the cover in the first direction when the cover is in the separated position.

5. The dual-bearing reel according to claim 1, further comprising
a coil spring configured to bias the cover from the proximate position to the separated position and a torsion spring configured to bias the cover in the first direction when the cover is in the separated position, the coil spring and the torsion spring being integrally formed.

* * * * *